Figure 1:
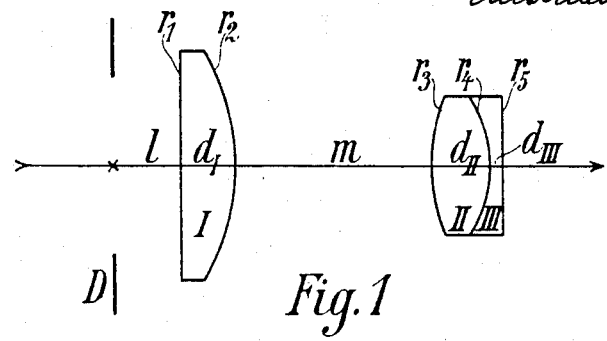

No. 873,870. PATENTED DEC. 17, 1907.
A. KÖNIG.
RAMSDEN OCULAR.
APPLICATION FILED FEB. 5, 1907.

UNITED STATES PATENT OFFICE.

ALBERT KÖNIG, OF JENA, GERMANY, ASSIGNOR TO THE FIRM OF CARL ZEISS, OF JENA, GERMANY.

RAMSDEN OCULAR.

No. 873,870.     Specification of Letters Patent.     Patented Dec. 17, 1907.

Application filed February 5, 1907. Serial No. 355,843.

*To all whom it may concern:*

Be it known that I, ALBERT KÖNIG, doctor of philosophy, a citizen of the German Empire, and residing at Carl Zeiss strasse, Jena, in the Grand Duchy of Saxe-Weimar, Germany, have invented a new and useful Ramsden Ocular, of which the following is a specification.

The invention has for its object improvements of that kind of Ramsden ocular in which a compound eye-lens system is made use of.

The chief errors of the Ramsden ocular with simple eye-lens are well known, viz., serious distortion and strongly marked chromatic aberration. Both these errors can be satisfactorily corrected, if—according to the precedent of Kellner—the single eye-lens be substituted by two lenses cemented together. On the other hand the definition in the image suffers from such substitution, particularly towards the margin of the field of view. This fact was at first either disregarded or lay entirely undiscovered, possibly from the reason that the use of the ocular, as then improved, was restricted to astronomical telescopes, the objectives of which have only a small relative aperture. It was only when prism telescopes were introduced with objectives of large relative aperture combined with a Kellner ocular, and particularly when the relative aperture of the objectives in these instruments came to be increased more and more, that the error in definition obtruded itself strongly.

As is already known, the eye-lens of the Kellner ocular is formed by a plano-concave dispersive lens of great relative dispersion and high refractive index and a double convex collective lens of small relative dispersion and low refractive index being cemented together. The collective lens of the eye-lens system is turned towards the first lens (the field-lens) of the ocular, so that the chromatically correcting cemented surface is also directed with its concavity towards the field-lens.

If an improvement in the Kellner ocular as to definition of the image be intended, it appears at first sight from the simple and closely related structure of the two oculars, the Ramsden ocular and the Kellner ocular proper, that, without great expenditure of means, only a compromise between their properties could be obtained, so that the errors of both old forms would still exist, though in lessened degree.

In the ocular according to the present invention all three errors, chromatic aberration and distortion in the original Ramsden ocular and the shortcomings in the definition of the Kellner form of the Ramsden ocular, are removed to such a degree, that what errors remain no longer incommode the observer. This result is maintained even when the dimensions of the new ocular are adapted to utilize a large field of view and to allow the employment of an objective with large relative aperture. This can be attained without having recourse to a compound field-lens, and also the number of lenses of the eye-lens system need not exceed, when not too high demands are imposed upon the quality of the image, the duality already made use of by Kellner.

In the Kellner ocular, improved according to the present invention so as to restore the sharpness of the image peculiar to the Ramsden ocular with simple eye-lens, two kinds of glass having a great difference between their relative dispersions are combined as formerly in a chromatically correcting cemented surface of the eye-lens system, but in contradistinction to the original Kellner ocular these kinds of glass are at the same time chosen, so that the difference in the refractive indices is only slight. A suitable pair could be formed, for example, from an ordinary silicate crown glass for the collective lens lying in front of the cemented surface and a flint of low refraction for the dispersive lens behind; another pair might consist of a barytasilicate crown and an ordinary silicate flint.

So far as good definition in the image of the improved Kellner ocular is dependent upon the correction for astigmatism, it is an essential condition, that, in the new eye-lens, the front component is bi-convex and has the lower refractive index, and that, further, the ratio of the front radius of curvature of the front lens to the radius of its back surface— to which ratio is to be added a tenfold difference of the indices of refraction of both lenses—does not rise above the value 2.0; this sum should not, however, fall below 1.4.

Figure 2:
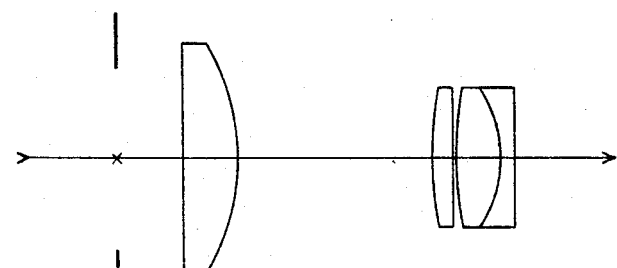
Figure 3:
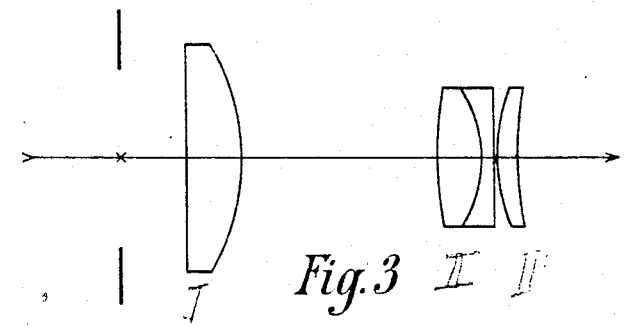
Figure 4:
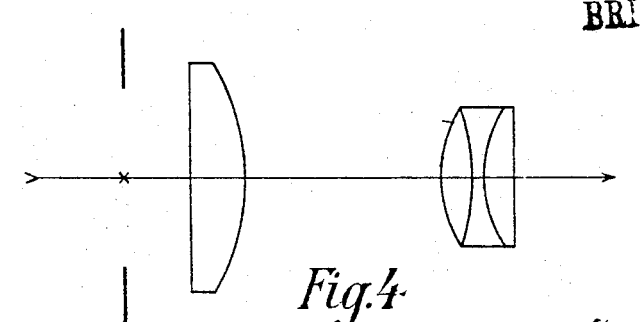

The correction of distortion can be raised to an extraordinarily high degree of perfection by making suitable choice of the elements of construction of the eye-lens system, so that the focal length of this system exceeds that of the ocular as a whole at least by $\frac{1}{10}$, at most by $\frac{9}{10}$. This rule of construction does not exclude the employment of that previously mentioned, concerning correction for astigmatism. The rule as to correction of distortion remains, moreover, in force in the case, where the eye-lens system is fitted—with a view to other improvements of the quality of the image—with a third lens cemented to the double lens or standing apart from it.
In the four figures of the drawing four constructional examples of the invention are represented. All these oculars are fitted with the same simple field-lens and adapted to the same field of view indicated by the diaphragm D. The eye-lens system of the ocular according to Fig. 1 is, as in the Kellner form of the ocular, only of double lens formation. In the three arrangements according to Figs. 2, 3 and 4 a collective lens has been added, in front of and close up to the cemented main eye-lens in Fig. 2, in Fig. 3 close behind it and in Fig. 4 likewise behind it, but at the same time cemented with the main eye-lens.
The radii, thicknesses and distances for the lenses employed in the first of the four examples are here tabulated and have reference to an ocular having a focal length 100. The kinds of glass are characterized by the refractive indices $n_C$ and $n_F$ appertaining to the lines C and F of the solar spectrum. As to the example Fig. 1, it will be seen, that $$\frac{r_3}{r_4} + 10(n_{\text{CIII}} - n_{\text{CII}}) = 1.5 + 0.2 = 1.7,$$

a mean value between the limits 1.4 and 2.0; the focal length of the eye-lens is 1.31 times that of the ocular, a value likewise between the limits 1.10 and 1.45.

| Radii. | Thicknesses and Distances. |
|---|---|
| $r_1 = \infty$ | $l = 26.3$ |
| $r_2 = 88.10$ | $d_I = 22.0$ |
| $r_3 = 73.42$ | $m = 78.3$ |
| $r_4 = 49.92$ | $d_{II} = 23.0$ |
| $r_5 = \infty$ | $d_{III} = 4.9$ |

Kinds of Glass.

| I | II | III |
|---|---|---|
| $n_C = 1.50801$ | 1.58846 | 1.60810 |
| $n_F = 1.51605$ | 1.59816 | 1.62470 |

I claim:
1. In a Ramsden ocular the combination with a field-lens of an eye-lens system in which two lenses having but little difference in refractive index are united in a chromatically correcting cemented surface which presents its concavity towards the field-lens.
2. In a Ramsden ocular the combination with a field-lens of a cemented double eye-lens, the front component of which is bi-convex and has an only slightly lower refractive index than the back component, the sum formed from the ratio of the front and back radii of the front component and from the tenfold difference of the refractive indices of both components varying between the limits 1.4 and 2.0.
3. In a Ramsden ocular the combination, with a field-lens of an eye-lens system, consisting of or comprising a double lens, the chromatically correcting cemented surface of which has its concave side towards the field-lens and unites kinds of glass having but little difference in refractive index, the ratio of the focal distance of the eye-lens system to that of the whole ocular varying between the limits 1.1 and 1.45.

ALBERT KÖNIG.

Witnesses:
   PAUL KRÜGER,
   FRITZ SANDER.